United States Patent [19]
Robinson et al.

[11] Patent Number: 5,636,366
[45] Date of Patent: Jun. 3, 1997

[54] SYSTEM AND METHOD FOR PRESERVING INSTRUCTION STATE-ATOMICITY FOR TRANSLATED PROGRAM

[75] Inventors: Scott G. Robinson, Tyngsboro; Richard L. Sites, Boylston; Richard T. Witek, Littleton, all of Mass.

[73] Assignee: Digital Equipment Corporation, Maynard, Mass.

[21] Appl. No.: 549,889

[22] Filed: Oct. 30, 1995

Related U.S. Application Data

[63] Continuation of Ser. No. 332,508, Oct. 31, 1994, abandoned, which is a continuation of Ser. No. 666,071, Mar. 7, 1991.
[51] Int. Cl.$^6$ ................................................. G06F 13/00
[52] U.S. Cl. ..................... 395/490; 395/726; 395/825
[58] Field of Search .............................. 395/375, 490, 395/726, 825

[56] References Cited

U.S. PATENT DOCUMENTS

| | | | |
|---|---|---|---|
| 4,674,038 | 6/1987 | Brelsford et al. | 395/182.13 |
| 5,193,167 | 3/1993 | Sites et al. | 395/490 |
| 5,218,712 | 6/1993 | Cutler et al. | 395/800 |

Primary Examiner—William M. Treat
Attorney, Agent, or Firm—David A. Dagg; Denis G. Maloney; Arthur W. Fisher

[57] ABSTRACT

A system or method is provided for translating a first program code to a second program code and for executing the second program code while preserving instruction state-atomicity of the first code. The first program code is executable on a computer having a first architecture adapted to a first instruction set and the second program code is executable on a computer having a memory and register state and a second architecture adapted to a second instruction set that is reduced relative to the first instruction set.

A first computer translates the first code instructions to corresponding second code instructions in accordance with a pattern code that defines first code instructions in terms of second code instructions. The second code instructions for each first code instruction organized in a granular instruction sequence having in order at least two groups, a first group having a first subgroup including second code read instructions and a second subgroup including modify instructions and a second group having a third subgroup including state update instructions subject to exception, including any special write instruction required to implement the first code instruction being translated, and a fourth subgroup including state update instructions free of exception.

34 Claims, 7 Drawing Sheets

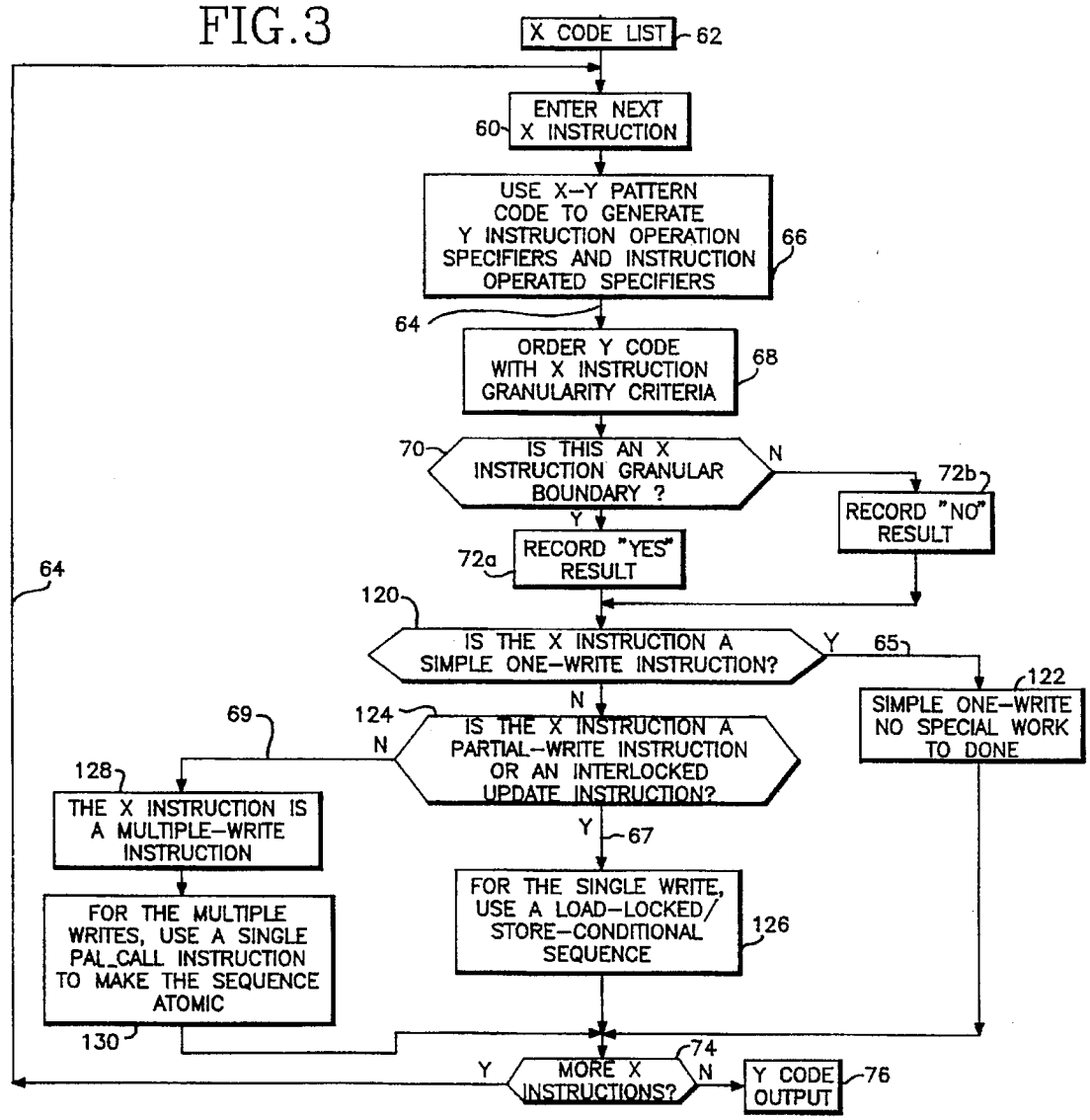

SYSTEM AND METHOD FOR PRESERVING INSTRUCTION STATE-ATOMICITY FOR TRANSLATED PROGRAM

This application is a continuation, of application Ser. No. 08/332,508 filed Oct. 31, 1994, now abandoned, which is a continuation of Ser. No. 07/666,071, filed on Mar. 7, 1991.

CROSS-REFERENCE TO RELATED APPLICATIONS

Reference is made to the following concurrently filed patent applications, which are hereby incorporated by reference: 07/666,039 filed on Mar. 7,1991. (PD91-0078/1870-0410) entitled IMPROVED SYSTEM FOR PRESERVING INSTRUCTION GRANULARITY FOR TRANSLATED PROGRAM CODE and filed concurrently herewith by Scott G. Robinson and Richard Sites.

Ser. No. 07/547,618 filed on Jun. 29, 1990, now U.S. Pat. No. 5,193,167. (Attorney Docket No. PD90-0259) entitled BRANCH PREDICTION IN HIGH PERFORMANCE PROCESSOR and filed by Richard L. Sites and Richard L. Witek on Jun. 29, 1990.

Ser. No. 07/666,039 filed on Mar. 7, 1991. (Attorney Docket No. PD86-0114) entitled APPARATUS AND METHOD FOR PROVIDING AN EXTENDED PROCESSING ENVIRONMENT FOR MICROCODED DATA PROCESSING SYSTEMS and filed by Richard T. Witek et al. on Jul. 1, 1987.

Reference is also made to the following concurrently filed patent applications assigned to the present assignee and related to code translation:

Ser. No. 07/666,070 filed on Mar. 7, 1991 (Attorney Docket No. PD91-0058) entitled BRANCH RESOLUTION VIA BACKWARD SYMBOLIC EXECUTION and filed by Richard L. Sites.

Ser. No. 07/666,216 filed on Mar. 7, 1991 (Attorney Docket No. PD91-0059) entitled LOCATING PROGRAM CODE BY SUCCESSIVE CODE EXECUTION AND INTERPRETATION and filed by Richard L. Sites.

Ser. No. 07/666,210 filed on Mar. 7, 1991 (Attorney Docket No. PD91-0062) entitled USE OF STACK DEPTH TO IDENTIFY MACHINE CODE MISTAKES and filed by Richard L. Sites.

Ser. No. 07/666,223 filed on Mar. 7, 1991 (Attorney Docket No. PD91-0071) entitled CROSS-IMAGE REFERENCING OF PROGRAM CODE and filed by Richard L. Sites.

Ser. No. 07/666,083 filed on Mar. 7, 1991 (Attorney Docket No. PD91-0100) entitled USE OF STACK DEPTH TO IDENTIFY ARCHITECTURE AND CALLING STANDARD DEPENDENCIES IN MACHINE CODE and filed by Thomas R. Benson.

Ser. No. 07/666,084 filed on Mar. 7, 1991 (Attorney Docket No. PD91-0101) entitled REGISTER USAGE TRACKING TO SUPPORT COMPILED 32-BIT CODE IN 64-BIT ENVIRONMENT and filed by Thomas R. Benson.

Ser. No. 07/666,085 filed on Mar. 7, 1991 (Attorney Docket No. PD91-0102) entitled MAPPING ASSEMBLY LANGUAGE ARGUMENT LIST REFERENCES ACROSS MACHINE ARCHITECTURES and filed by Thomas R. Benson.

Ser. No. 07/666,082 filed on Mar. 7, 1991 (Attorney Docket No PD91-0103) entitled TRACKING VAX® CONDITION CODE FOR PORTING TO RISC ARCHITECTURE and filed by Thomas R. Benson.

Ser. No. 07/666,023 filed on Mar. 7, 1991 (Attorney Docket No. PD91-0104) entitled EFFICIENT AND FLEXIBLE LINK OF PROGRAM UNITS AT PROGRAM ACTIVATION and filed by Daniel L. Murphy.

Reference is also made to the following concurrently filed patent applications assigned to the present assignee:

Ser. No. 07/666,039 filed on Mar. 7, 1991 (Attorney Docket No. PD91-0078/1870-0411) entitled IMPROVED SYSTEM AND METHOD FOR EXECUTING MULTIPLE CODES IN A MULTI-ARCHITECTURE ENVIRONMENT WITH CODE DEBUGGING CAPABILITY and filed by Mark A. Herdeg, James A. Wooldridge, Scott G. Robinson, Ronald F. Brender and Michael V. Iles.

Ser. No. 07/666,028 filed on Mar. 7, 1991 (Attorney Docket No. PD91-0105/1870-0416) entitled SYSTEM AND METHOD FOR AUTOMATICALLY INTERFACING CALL CONVENTIONS BETWEEN TWO DISSIMILAR PROGRAM UNITS and filed by Daniel L. Murphy.

Ser. No. 07/665,888 filed on Mar. 7, 1991 (Attorney Docket No. PD91-0147/1870-0419) entitled IMPROVED SOFTWARE DEBUGGING SYSTEM AND METHOD ESPECIALLY ADAPTED FOR CODE DEBUGGING WITHIN A MULTI-ARCHITECTURE ENVIRONMENT and filed by James A. Wooldridge, Ronald F. Brender and Henry N. Grieb, III.

Ser. No. 07/666,022 filed on Mar. 7, 1991 (Attorney Docket No. PD91-0165/1870-0420) entitled IMPROVED SIMULATOR SYSTEM AND METHOD ESPECIALLY ADAPTED FOR CODE EXECUTION IN A MULTI-CODE EXECUTION AND DEBUGGING SYSTEM WITHIN A MULTI-ARCHITECTURE ENVIRONMENT and filed by Mark A. Herdeg and Michael V. Iles.

Ser. No. 07/666,072 filed on Mar. 7, 1991 (Attorney Docket No. PD91-0166/1870-0421) entitled IMPROVED SYSTEM AND METHOD FOR DETECTING CROSS-DOMAIN INSTRUCTION CALLS AND DATA REFERENCES ESPECIALLY ADAPTED FOR CODE INTERFACE JACKETING IN A MULTI-CODE EXECUTION AND DEBUGGING SYSTEM WITHIN A MULTI-ARCHITECTURE ENVIRONMENT and filed by Mark A. Herdeg, Scott G. Robinson, Ronald F. Brender and Michael V. Iles.

Ser. No. 07/665,752 filed on Mar. 7, 1991 (Attorney Docket No. PD91-0167/1870-0422) entitled IMPROVED SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT and filed by Ronald F. Brender and Michael V. Iles.

Ser. No. 07/665,886 filed on Mar. 7, 1991 (Attorney Docket No. PD91-0209/1870-0423) which is entitled FASTER PROCESS FOR DEVELOPING NEW COMPUTER SYSTEMS EMPLOYING NEW AND BETTER PROCEDURES FOR SOFTWARE DEVELOPMENT AND TESTING and filed by Robert V. Landau, James E. Johnson and Michael V. Iles.

BACKGROUND OF THE INVENTION

The present invention relates to systems and methods for adapting program codes for execution on different computer systems and more particularly to systems and methods for translating codes based on one instruction set to codes based on a relatively reduced instruction set while preserving instruction state-atomicity.

In the early years of computer programming, instructions for computer programs were generated at the microcode level. With the development and growth of software engineering, more tasks were combined in single complex instructions executable by computers having a hardware architecture designed for the instruction complexity.

Increasing instruction complexity generally provided increasing price/performance benefits in the developing environment of computer hardware costs and performance capabilities. As a result, complex instruction set codes (CISC) became widely accepted.

With increased instruction complexity, however, it has become more difficult to design system hardware for higher execution speed. Instead, a reduced instruction set code (RISC), coupled with correlated RISC computer hardware architecture, has gained acceptance as a mechanism to lead to significantly improved system price/performance.

A RISC system generally employs simpler basic instructions to direct desired operations. A single RISC instruction normally specifies a single operation with at most a single memory access. Further, a RISC system normally provides a register for each basic instruction. The instructions in a RISC instruction set are still above the microcode level.

In the typical CISC system, a single instruction may specify a complex sequence of operations and may make many direct accesses to memory. Thus, operations performed by a CISC instruction may require several RISC instructions.

A RISC system is generally designed with optimized hardware and software tradeoffs that provide faster system operation, overall better system performance, and lower system cost relative to available hardware cost and performance capability.

One obstacle to conversion from CISC systems to RISC systems is the existence of large software libraries which have been developed for CISC systems and which are not generally available for RISC systems. When a computer system user chooses to acquire a new computer system, one of the user's major considerations is whether the user's library of application programs can be converted for use on the new computer system, or what the cost of replacing that library would be. Thus, for computer system users who wish to achieve better price/performance through RISC computer systems, it is highly important that an economic and effective mechanism be provided for adapting, or "migrating," the user's library of application programs for execution on the RISC computer system.

Several choices are available to the user for program migration. Recompiling or recoding can be employed, but these techniques are typically used for migrating programs written in a high level language such as FORTRAN and which either have no detailed machine dependencies or have any existing machine dependencies removed by manual programming modifications. Further, in recompiling or recoding, the user typically bears all responsibility for program modification and program behavioral guarantees.

Alternatively, interpretation procedures can be used, but the penalty for this approach typically is substantially reduced program performance.

More particularly, interpretation procedures are software programs that run on one computer and read a stream of subject instructions (which may well be instructions for a different type of computer) as data, and for each subject instruction to perform the indicated operation. Such procedures typically execute 10 to 100 machine instructions on the one computer to interpret a single subject instruction. Thus, interpretation procedures provide substantially reduced program performance, compared to direct execution of functionally-equivalent code on the one computer.

The most effective and efficient migration, however, involves code translation. In code translation, each instruction from an existing program is translated into one or more instructions in the language of the destination machine. Accordingly, a translation of CISC programs to RISC programs, or more generally a program translation in which the translated code has a relatively reduced instruction set, requires "multiple" or "many" instructions in the translated code for each instruction in the code being translated. However, in making "one to many" or CISC-to-RISC code translations, it is generally difficult to preserve many of the instruction behavior guarantees originally provided with the CISC or other relatively complex code.

One normal CISC guarantee that presents some difficulty in translation is the requirement that no other CISC instruction or portion thereof can be executed between the beginning and ending of a single CISC instruction. Accordingly, in translating CISC to RISC it is essential that this type of instruction wholeness or granularity be preserved. Preservation of instruction granularity requires that state or memory atomicity be preserved. Thus, either all memory accesses in an instruction must appear to happen or none must appear to happen in the translated code.

To preserve instruction granularity in the translation process, assurance must be provided that each set, or "granule," of translated instructions corresponding to each more complex instruction will execute to produce the same result that the corresponding more complex instruction would have produced. This must be true even though asynchronous events may occur during execution of any of the "granules" of simpler translated instructions.

The above cross-referenced and concurrently filed patent application Ser. No. 07/666,025 is directed to an invention that provides for the preservation of instruction granularity in code translation and in execution of the translated code. Further, that patent application generally achieves state atomicity and specifically discloses a mechanism and procedure for assuring state atomicity in the case of one-write instructions in the CISC or other code to be translated.

A one-write instruction includes at most one state write that can possibly encounter an exception, but can include an unlimited number of exceptionless state writes. No overlap exists between the two kinds of state writes.

The term "exception" is meant herein to refer to any condition that prevents continuation of the execution of an instruction. Typical exceptions include:

a. memory exceptions such as a page fault or an access violation;

b. arithmetic exceptions such as a floating-point overflow or a divide-by-zero; and c. instruction exceptions such as an illegal operation code or a breakpoint instruction.

State atomicity is equivalent to instruction granularity in the case of a one-write instruction that is translated and executed in accordance with the 1870–0410 patent application. However, other kinds of instructions that must be translated include sequences that present special problems in achieving the preservation of state atomicity and instruction granularity.

Such instructions include those that have:

a. a read-modify-write sequence that is "interlocked," or a read-modify-write that requires a partial-memory-word-write and that must be executed on a multiprocessor system with no intervening write by another processor; and b. multiple state writes that can possibly encounter an exception and must all appear either to happen or not to happen.

In these special cases, more particular mechanisms and procedures are needed to address the special circumstances faced while attempting to achieve state atomicity and instruction granularity in the translated code. In the case of instructions having multiple state writes, a state atomicity problem arises where an asynchronous event occurs during execution of an instruction sequence after at least one, and before all of the state (memory or register) writes has been executed. Thus, an exception could occur in one of the translated code instructions remaining to be executed in the sequence such that, if the instruction granule execution is either aborted or continued, a state error may be created since an irreversible state change may already have occurred with the one state write already executed.

In the case of executing translated code on a system having multiple processors with a common memory, a state atomicity problem may arise since a first processor in which the translated code is being executed may partially execute a read-modify-write sequence in an instruction granule, and subsequently, but before the read-modify-write sequence is completed, another processor may write to the state location addressed by the read-write-modify sequence. Again, if the instruction granule execution is either aborted or continued after the conflicting state access by the other processor, a state error may be created since an irreversible state change may already have occurred.

Accordingly, the present invention is directed to structure and procedures for producing and executing translated codes having relatively reduced instruction sets from existing codes having more complex instruction sets while preserving instruction granularity and state atomicity where the codes include instructions involving special circumstances such as multiple or partial writes, interlock instructions, and a multiprocessor execution environment. The present invention thus enables computer system price/performance improvements to be realized while preserving application code investments even in cases where such special circumstances are present.

SUMMARY OF THE INVENTION

A system or method is provided for translating a first program code to a second program code and for executing the second program code while preserving instruction state-atomicity of the first code. The first program code is executable on a computer having a first architecture adapted to a first instruction set and the second program code is executable on a computer having a memory and register state and a second architecture adapted to a second instruction set that is reduced relative to the first instruction set.

A first computer translates the first code instructions to corresponding second code instructions in accordance with a pattern code that defines first code instructions in terms of second code instructions. The second code instructions for each first code instruction are organized in a granular instruction sequence having in order at least two groups, a first group including those second code instructions that do instruction work other than state update and which can be aborted after execution without risking a state error, and a second group having all memory and register state update instructions including any special write instruction required to implement the first code instruction being translated.

A first special write instruction is structured to include a first subsequence for processing a single write to a first memory location in accordance with a requirement that the first subsequence must be executed without any interruption and without any intervening conflicting writes to the first memory location by any other processor that may be coupled to the memory state. Further, a second special write instruction is structured to include a second subsequence for processing multiple writes that must all be executed without any interruption.

A second computer system is adapted with the second architecture to execute the second program code. During the second code execution, means are provided for determining the occurrence of each asynchronous event during second code execution, and the occurrence of each conflicting write to the first memory location by the other processor if it is coupled to the memory state.

Any granular second code instruction sequence is aborted for a retry to preserve first code instruction state-atomicity and first code instruction granularity if an asynchronous event interrupt occurs during the sequence execution before all of the first group instructions have been executed or, if the first group instructions have been executed, before the execution of any second group instruction that is subject to a possible exception, thereby enabling subsequent asynchronous event processing.

The first special instruction subsequence in any granular second code instruction sequence that includes the first subsequence is aborted for a retry until successful execution is completed if a conflicting write is made by the other processor before completion of execution of the first subsequence. Any granular second code instruction sequence that includes the first subsequence is aborted for a retry if an asynchronous event interrupt occurs during attempted execution of the first subsequence.

The processing of an asynchronous event interrupt is delayed and any granular second code instruction sequence being executed is completed A) if the second subsequence is included in the granular instruction sequence and if the asynchronous event interrupt occurs at most after a first write during execution of the second instruction subsequence, or B) if the asynchronous event interrupt occurs after execution of all state update instructions in the second group that are subject to possible exception.

BRIEF DESCRIPTION OF THE DRAWINGS

The accompanying drawings, which are incorporated in and constitute a part of this specification, illustrate one embodiment of the invention and, together with the description, provide an explanation of the objects, advantages and principles of the invention. In the drawings:

FIG. 3 shows a general flow chart for the X-Y translation program in accordance with the present invention;

DESCRIPTION OF THE PREFERRED EMBODIMENT

Figure 1:
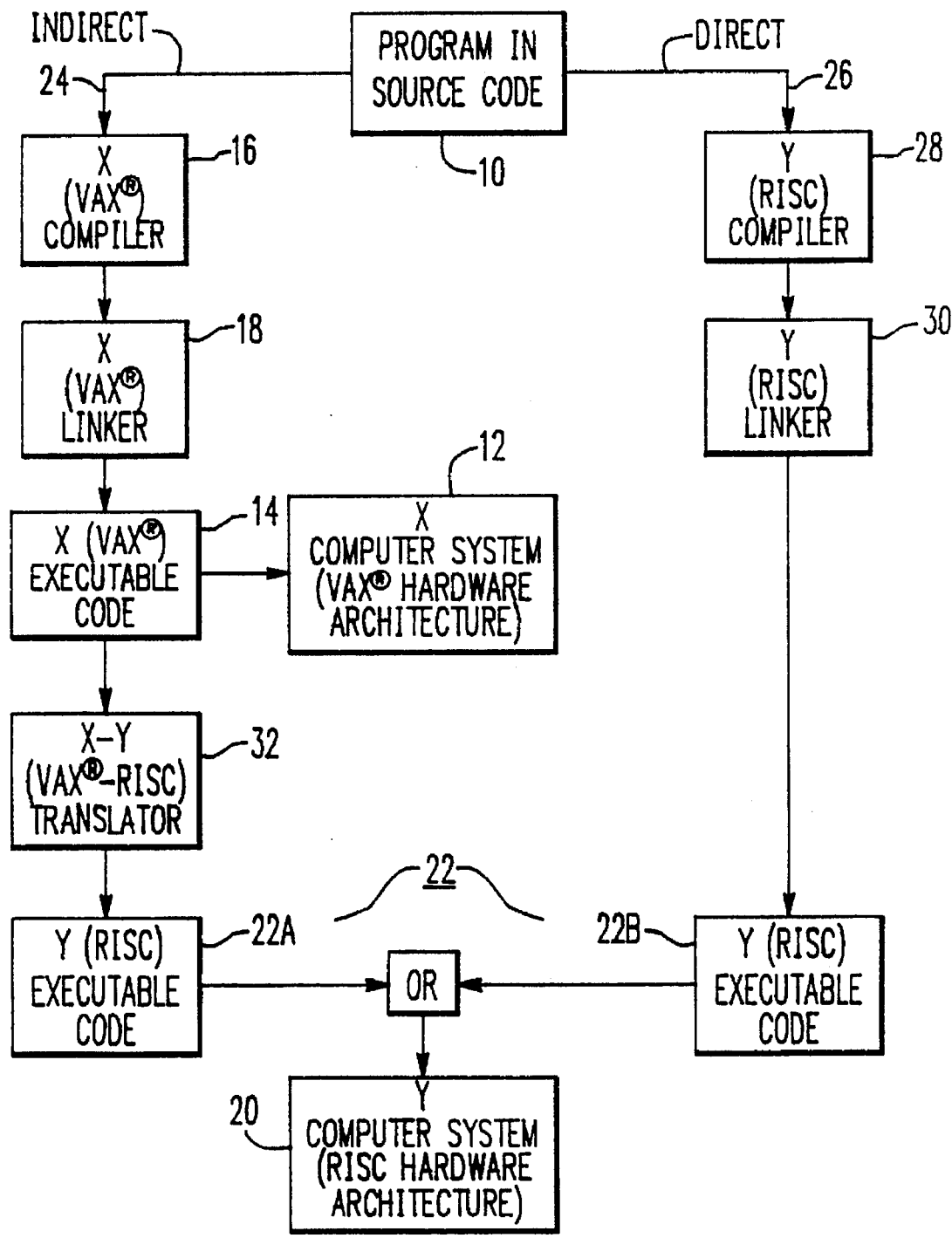
FIG. 1 shows an overall functional block diagram indicating the general manner in which application programs are a.) created for execution by a first computer system (having a first instruction set and designated as X) and b.) translated with X instruction state-atomicity and instruction granularity in accordance with the present invention for execution by a different computer system (designated as Y) having a relatively reduced instruction set.

As shown in FIG. 1, an application program 10, written in source code, is one of a number of application programs held in a user's program library for execution in an X computer system 12. The hardware architecture for the X computer system 12 is adapted for operation with an X instruction set employed in producing an executable form of the program 10 or other application programs in the user's library.

To adapt the program 10 for use with a Y computer system 20, it is necessary for the executable form of the program 10 to be provided as a Y executable code 22 employing a Y instruction set to which the hardware architecture of the Y computer system 20 is adapted.

The Y instruction set generally employs fewer basic instructions than the X instruction set employs, and conversion of X code to Y code requires a "one to many" instructions translation. The X instruction set can be a CISC instruction set and the Y instruction set can be a RISC instruction set. For example, as specifically indicated for illustrative purposes in FIG. 1, the X system can employ the VAX® architecture and the Y system can employ the VAX® RISC architecture both of which are supplied by Digital Equipment Corporation, assignee of the present application.

As shown in FIG. 1, the application program 10 can be migrated to the Y executable code 22 in either an indirect path 24 or a direct path 26. Direct migration is obtained with the use of a Y compiler 28 and a Y linker 30. The resultant Y executable code is designated by the reference numeral 22B.

If a Y compiler 28 and Y linker 30 have never been developed or are unavailable, or if otherwise the user elects not to use the direct migration path 26 because of associated disadvantages, the indirect path 24 is used in accordance with the present invention to migrate the X application program to the Y system to achieve both a program investment savings and a system performance gain.

In the indirect path, the program 10 is converted to executable code 14 for the X computer system 12 by means of an X compiler 16 and an X linker 18. The result is X executable code 14 which can run on the X computer system 12.

An X-Y translator 32 is provided the preferred embodiment to translate the X executable code 14 into the corresponding Y executable application code designated by the reference numeral 22A. The code translation is achieved so that the Y code executes to achieve accurately the X code results with instruction granularity and state atomicity even though the Y code is based on a reduced instruction set.

Translation of X Application Code to Y Application Code

A code translation system 40 (FIG. 2) is employed to implement the translator 32 referenced in FIG. 1. The translation system 40 includes a conventional general purpose computer having a processor 42, a memory system 44, and various input/output devices through which X application code 43 is input for translation.

The translation results are generated in accordance with the present invention as Y code 45 which is ordered and otherwise structured to define hard guarantees of the code being translated. Y code 45, particularly structured to facilitate a guaranteed preservation of X instruction granularity and state atomicity when the Y code is actually executed. As an example of hard CISC guarantees, the VAX® architecture includes the following guarantees and standards:

1. A single instruction must either run to completion or appear never to have started—it is not allowed to partially execute an instruction, suspend it, do other instructions, and eventually restart the suspended instruction in the middle.
2. Memory is virtual, so any memory access may encounter a page fault or access-protection exception, causing the instruction not to complete.
3. A single instruction may write multiple memory locations; either all writes or none must occur. If none occurs, the instruction will be restarted at the beginning, not from the point of the failed write.
4. Memory operands may (partially) overlap, such that doing one of many writes and then stopping can overwrite source operands and make restarting the instruction impossible.
5. A single instruction may do a read-modify-write sequence.
6. Instruction operands are allowed to be an arbitrary byte length at arbitrary byte addresses, while memory hardware implementations typically can read or write only an integral number of aligned memory words, consisting typically of 4 or 8 bytes. Thus, a single operand can span 2 or more memory words, and accessing a single operand may involve accessing extra bytes in the first and last memory word.
7. In a multiprocessor system, accesses to adjacent bytes by different processors must always appear to be independent—i.e., writing byte 5 on one processor must not interfere with writing byte 6 on another processor, even if both writes involve read-modify-write sequences to the same memory word.
8. In a multiprocessor system, accesses via interlocked instructions must always appear to be atomic—i.e., an interlocked read-modify-write to byte 4 on one processor must never interfere with an interlocked read-modify-write to the same location on another processor.

The memory system 44 includes, among other sections, a conventional data storage section 46 and a section 48 in which the computer operating system is stored. A basic element employed in X-Y code translation is a translation program 50 stored in another memory section. The input X code 43 is stored as an X code list 62. Further, to control the sequencing of Y instructions, Y instruction ordering criteria 52 are stored; and X-Y instruction code patterns 54 are stored to enable translation of both instruction operation specifiers and instruction operand specifiers.

A general flow chart is shown for the translation program 50 in its preferred form in FIG. 3. Successive X instructions are entered sequentially by block 60 from the stored X code list 62 for processing through a program loop 64.

Figure 2:
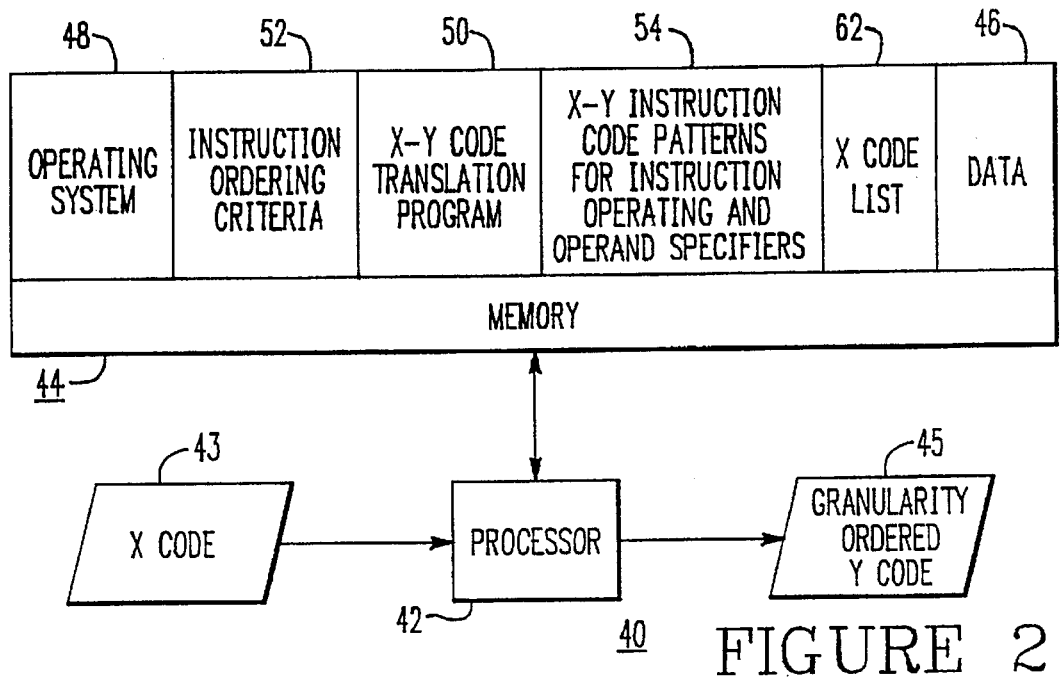
FIG. 2 shows a generalized functional block diagram of the preferred X-Y translation program and a general purpose computer system in which the X-Y translation program is executed to generate, with X instruction state-atomicity, a Y executable application code from an input X application code.

In the loop 64, functional block 66 generates Y instruction operation and operand specifiers which corresponds to the currently processed X instruction. The specifiers are generated in accordance with the stored X-Y code patterns 54 (FIG. 2). Next, as indicated by functional block 68, the resultant Y code is ordered in accordance with predetermined criteria that result in facilitated preservation of X instruction granularity during subsequent actual Y code execution.

Figure 6:
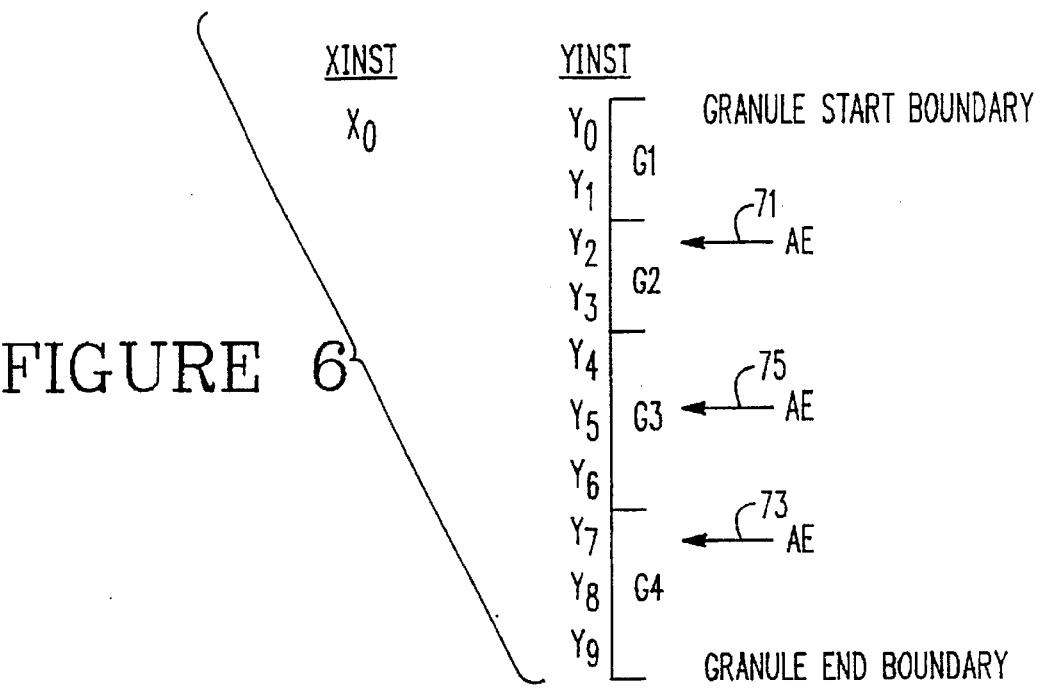
FIG. 6 shows a diagram that symbolizes an X-Y code instruction translation involving multiple writes and the relationship of asynchronous events thereto.

A graphic representation of an X-Y instruction translation is shown in FIG. 6.

Every X instruction generally provides for the elemental tasks of getting inputs, modifying inputs, placing the results in temporary storage, and providing a state update for memory and register locations. When an X instruction is translated to "many" Y instructions, the ordering criteria 52 (FIG. 2) employed to organize the Y instructions preferably are those that group and order the Y instructions in the Y code for the currently translated X instruction (granule) as follows:

1. A first group G1 of instructions in the Y code are those that get inputs and place those inputs in temporary storage.
2. A second group G2 of instructions in the Y code are those that operate on inputs and generate modified results and store those results to temporary storage.
3. A third group G3 of instructions in the Y code are those that update X state (memory or register) and are subject to possible exceptions (as defined hereinafter).
4. A fourth and last group G4 of instructions in the Y code are those that update X state (memory or register) and are free of possible exceptions.

Figure 4:
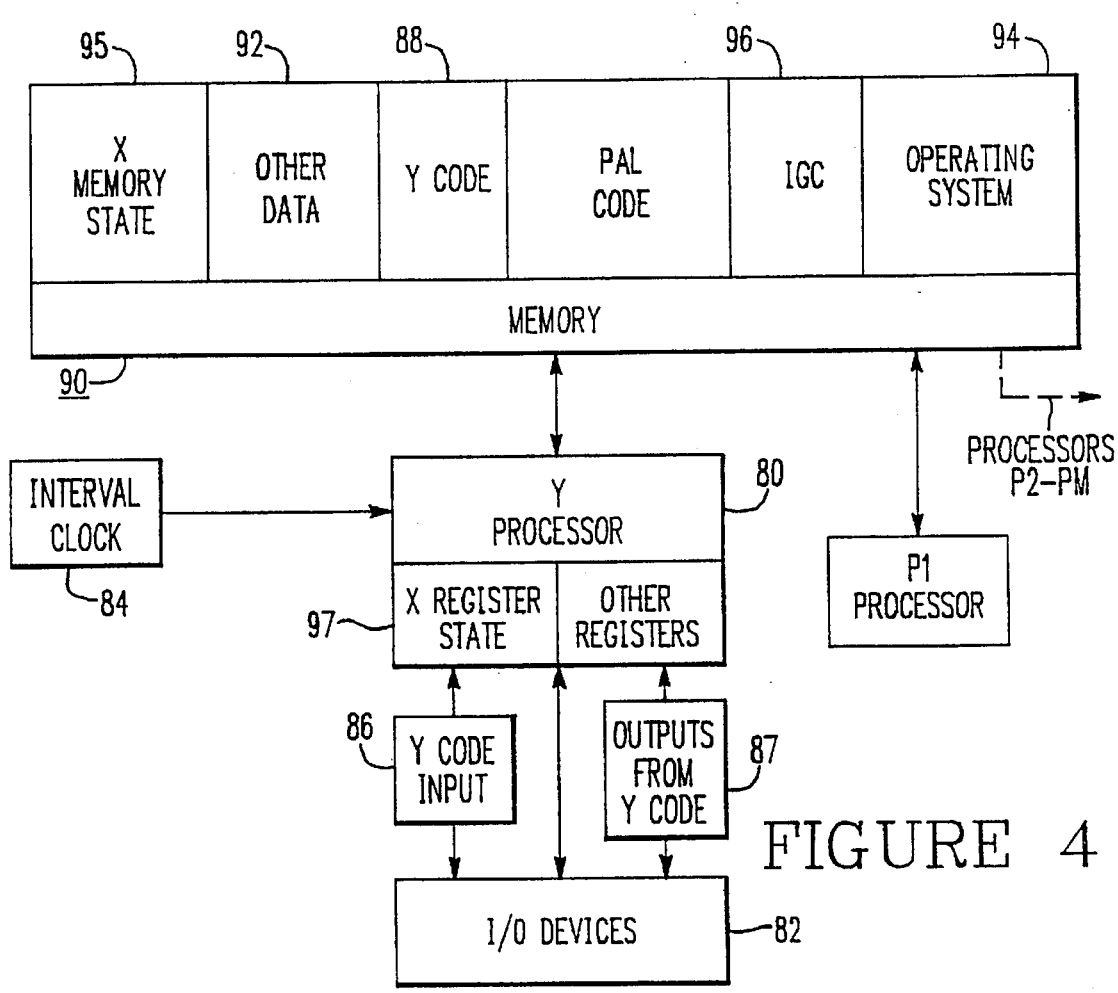
FIG. 4 shows a functional block diagram of the Y computer system with the translated or Y code loaded therein along with an instruction granularity control (IGC) program, a privileged architecture library (PAL) code routine, and a load locked conditional sequence stored for controlling the Y code execution with preservation of instruction granularity and state-atomicity in accordance with the present invention.

X memory state, which is represented by the reference character 95 in FIG. 4, and X register state, which is represented by reference character 97, in FIG. 4 refer to memory and register structure in the Y machine dedicated to be X code defined storage locations. X memory and register states can also be memory state and register state that are visible to the X architecture.

Additional information on the advantages of organizing the translated code instructions in the manner described, especially as applied to the case of simple one-write Y instructions, is set forth in the cross-referenced patent application Ser. No. 666,025.

State atomicity essentially requires that all state accesses of the X instruction appear to happen without intervention or none appears to happen. This condition is needed to provide X instruction granularity. In a special case described below, X state atomicity is achieved through operation of the present invention thereby enabling X instruction granularity to be achieved.

With reference again to FIG. 3, once the functional block 68 orders the Y instruction code as described, test block 70 determines whether the current Y instruction is a boundary or "X granule" marker for the X instruction from which it was derived. If a determination is made at block 70 that the current Y instruction is a boundary marker, control proceeds to block 72a in which a "yes" result is recorded and associated with the current Y instruction. If a determination is made at block 70 that the current Y instruction is not a boundary marker, control proceeds to block 72b in which a "no" result is recorded and associated with the current Y instruction. Preferably, the yes and no bits resulting from the test for successively processed Y instructions are recorded in an X boundary instruction bit map by functional block 72.

Next, a series of tests are made to determine which of a plurality of translation processing branches is to be followed. Each branch corresponds to a generally predefined translation case (i.e., kind of X instruction), with those predefined cases that are classified as special requiring special translation processing for preservation of memory atomicity. In this embodiment, any of three branches 65, 67 and 69 may be followed according to the structural character of the X instruction currently being executed.

Generally, the branches 65, 67 and 69 process each X instruction to produce translated code that generally preserves hard guarantees of the and that particularly preserves state atomicity.

It is further noted that for the purposes of translation, it is assumed that a single RISC store instruction of a single aligned longword (4 bytes) or quadword (8 bytes) is atomic on a RISC machine, in the sense that all bytes are modified simultaneously, and no other bytes are affected by the store. It is further assumed that all state is kept in either memory or registers, that memory accesses may create virtual-memory exceptions, and that simple register moves never create exceptions. It is further assumed that a sequence of RISC instructions may be interrupted by external events at an arbitrary RISC instruction.

In FIG. 3, the translation branch 65 is followed if test block 120 indicates that the current X instruction is a simple one-write instruction. In this case, processing is carried out as set forth in the cross-referenced patent application Ser. No. 07/666,025. Specifically, as indicated by functional block 122, no special translation work is required and block 74 determines whether there are more X instructions to be translated. If so, execution of the program loop 64 is repeated.

With reference again to the translation flow chart, if the current X instruction is not a simple one-write instruction, a determination is made in test block 124 whether the X instruction is one of a plurality of predefined special one-write cases. In the present embodiment, there are two predefined special one-write cases, i.e., a partial write instruction and an interlocked update instruction. If either special one-write case applies, functional block 126 operates in the translation branch 67 to preserve state atomicity by inserting a state atomicity sequence into the translated code. The state atomicity sequence assures (at run time) either 1) completion of the partial write or the interlocked update if no interrupt occurs during the read-modify-write sequence, or 2) suspension of the partial write or the interlocked update for a retry if an interrupt does occur during the read-modify-write sequence.

The state atomicity sequence inserted into the translated instruction code in the block 126 is preferably one that is called a load-locked/store-conditional sequence. A suitable hardware mechanism for implementing this sequence in the Y computer system at run time is disclosed in the referenced Digital Equipment Corporation patent application Ser. No. 07/547,618.

Figure 8:
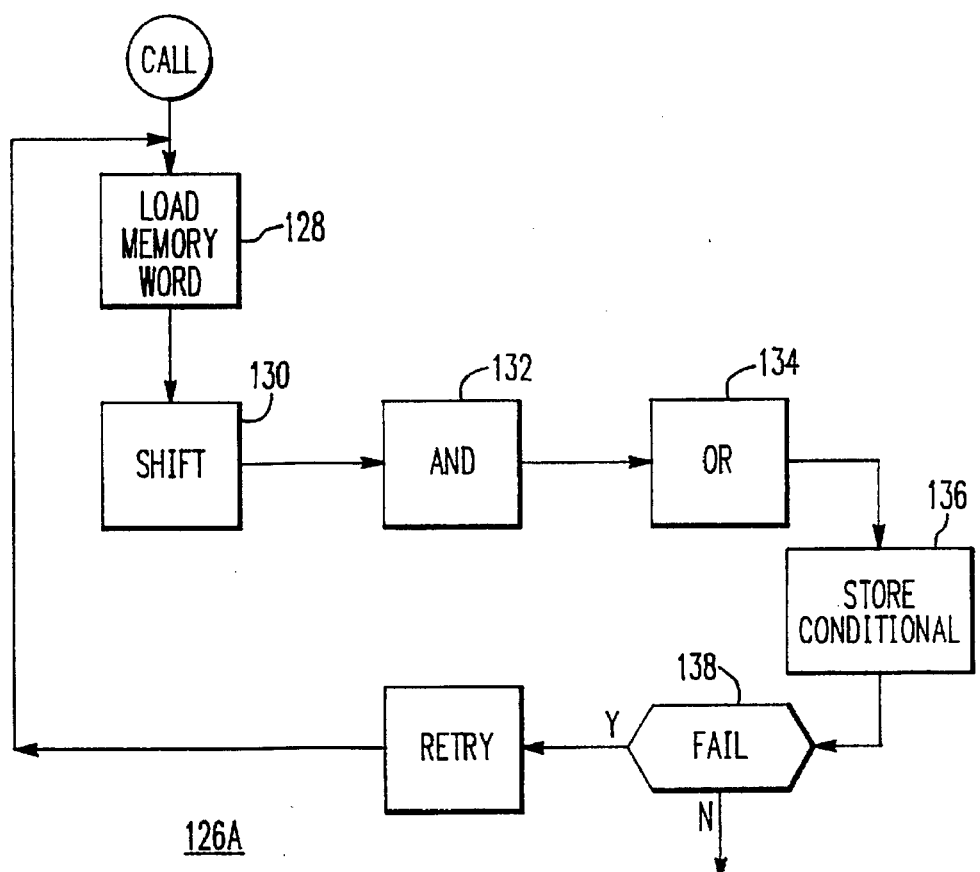
FIG. 8 shows a flow chart representing of the load locked/store-conditional sequence of FIG. 4 with detail that indicates the manner in which it is employed in accordance with the present invention to preserve state atomicity and instruction granularity in cases of partial-write and interlocked update instructions.

A generalized flow chart is shown in FIG. 8 to illustrate the run-time logic operation performed by the load-locked/store-conditional sequence designated by the reference character 126A. Thus, once the sequence 126A is called, functional block 128 loads the memory word for which a read-modify-write (RMW) operation is to be performed.

The modify tasks are performed by blocks 130, 132, and 134. In the illustrative case of adding a byte to a defined memory location, the block 130 performs a shift operation to provide byte alignment in the memory word. Next, the block 132 masks the byte to be changed with zeroes. Finally, the block 134 puts the masked byte in place in the memory word.

If during execution of the RMW sequence at run time another processor writes to the same memory location, the RMW sequence is failed to prevent interference between two independent memory writes. Block 136 executes a store-conditional to detect whether another memory write to the same memory location has occurred during the read and modify portions of the RMW sequence. If no other write has occurred, the store-conditional is implemented so that the modified memory word is written with state or memory atomicity maintained because their was no conflict with another write. Test block 138 ends the sequence. Further processing of the current Y instruction at run time then is controlled in accordance with instruction granularity control programming described more fully hereinafter.

If on block 136, another processor has made a write to the memory location of the word being modified during the read and memory portions of the RMW sequence, the store-conditional is cancelled thereby to preserve memory atomicity and the RMW sequence is retried later.

With reference again to the translation process in FIG. 3, once the sequence 126A is placed into the current Y instruction, the block 74 tests for more X instructions. If more instructions exist, control proceeds along path 64 to the instruction enter block 60 repeating the program cycle.

In summary of the case of processing a single-write CISC-to-RISC translation by the branch 67, a CISC instruction has one partial (1- or 2-byte) aligned write to state and the translated code is to be executed in a multiprocessor system, or an interlocked access is required. In this case, independent byte access and a read-modify-write sequence must be appropriately processed if state atomicity is to be preserved.

In the single-write case of the branch 67, the translation is constrained such that group 1 and 2 instructions do all the work of the CISC instruction except for memory and/or register state update, including a load-locked of the single longword/ quadword containing the operand to be updated. Group 3 instructions include a store-conditional instruction to the same longword/quadword, and group 4 instructions include branch-on-fail instructions to the beginning of the sequence, followed by simple register moves.

A translated sequence that is interrupted before the instruction group 3 is completed fails the store-conditional instruction when restarted, and hence branches back to the beginning of the sequence. In addition, if another processor writes to the specified longword/quadword after a load-locked instruction but before the store-conditional instruction, the store-conditional will fail and hence branch back to the beginning of the sequence.

A translated sequence that is interrupted after the instruction group 3 is completed but before the instruction group 4 is completed is forced to complete the instruction group 4 by a mechanism interpreting forward through simple register moves as more fully considered in the cross-referenced application 1870-0410. The net effect is that each translated sequence either executes from beginning to end with no other translated sequence in the middle and no other write to the subject longword/quadword, or the execution of that sequence is suspended before the completion of group 3 and subsequently retried from the beginning.

With reference again to FIG. 3, if test block 124 finds that the X instruction being translated has no special one-write instruction, the translation branch 69 is entered and block 128 registers the fact that the X instruction being translated is another special case, i.e., a multiple-write X instruction. Functional block 130 then inserts in the translated instruction code a PAL__CALL routine 132 (FIG. 7) to provide state atomicity for multiple-write instructions in a manner more fully described hereinafter.

The PAL__CALL routine 132 is called for execution at run time from a Privileged Architecture Library included in computer system 20 and typically available in many computer architectures to provide a mechanism for executing routines called from it with the highest operating system priority. In general, the PAL__CALL routine 132 executes all of the state writes with state atomicity if no asynchronous event interrupts occurred prior to the call for the routine, and if no possible exceptions are detected in the remaining sequence in the current Y code instruction granule. Otherwise, the PAL__CALL routine 132 is failed prior to its execution with memory atomicity preserved for a subsequent retry.

The PAL__CALL routine 132 is preferably implemented by hardware structure disclosed and described in the referenced patent application PD86-0114.

Reference is made to FIG. 6 for a diagrammatic representation of the relationship of asynchronous events to the Y code instructions in the case of multiple writes. In this special case, an arrow 75 indicates an asynchronous event that occurs after a first write is processed (by the PAL__CALL routine 132) but before all multiple writes are executed by the PAL__CALL routine 132. Generally, state atomicity can be preserved in this case by suspending execution of the interrupt until the PAL__CALL routine 132 and the rest of the instruction granule are executed.

Figure 7:
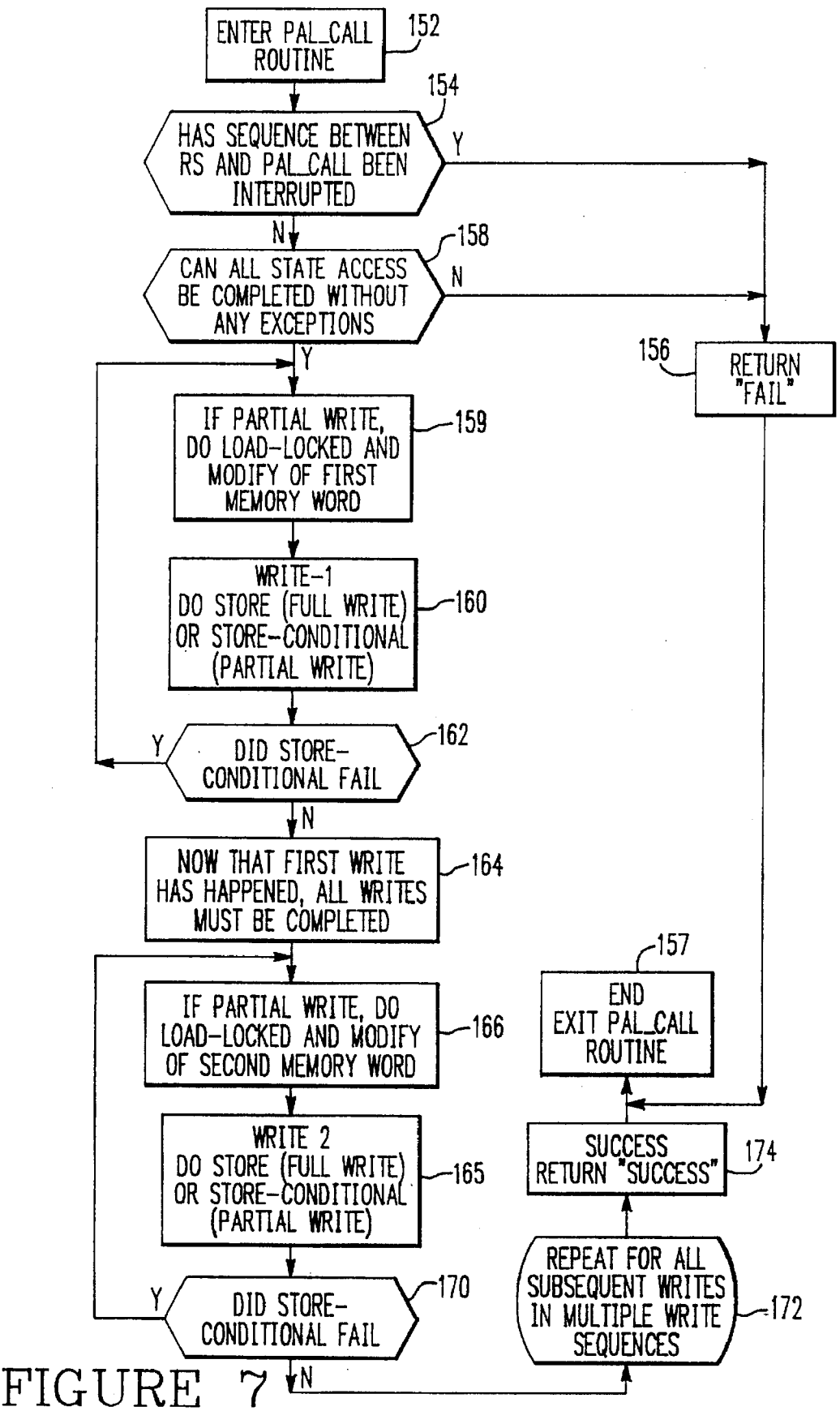
FIG. 7 shows the PAL code routine of FIG. 4 with detail that indicates the manner in which it is employed in accordance with the present invention to preserve state atomicity and instruction granularity in the case of multiple memory writes.

More particularly, the reference to the flow chart for PAL__CALL routine 132 shown in FIG. 7, after the PAL__CALL routine 132 is called by a Y code granule being executed at run time for the translated code, it is entered as indicated by functional block 152. Next, block 154 tests whether an interrupt has occurred during the sequence between RS and before the call for the PAL__CALL routine 132. If so, block 156 returns a fail message for the instruction sequence in order to preserve state atomicity, control is returned to the calling procedure through exit block 157 for a new try at executing the current Y code granule.

If no interrupts have occurred during that critical time preceding the PAL__CALL routine, test block 158 determines whether all state accesses remaining can be completed without any exceptions. If not, the block 156 again returns a fail message for the instruction sequence made to preserve state atomicity, and the routine is exited through block 157 to allow retry of the Y code sequence.

If remaining state accesses can be completed without exceptions, execution of the PAL__CALL routine 132 is initiated and functional block 159 does a load-locked and modify of the first write if a partial write is specified. Block 160 then performs a store-conditional for a partial write or a store for a full write.

Test block 162 determines whether the store-conditional failed in the case of a partial write. If so, the routine is preferably returned to the block 159 for a partial write retry as shown. If desired, a fail message can be returned instead at this point.

If a full write has been stored or once a partial write has been successfully stored, a first write in the multiple write sequence has occurred and all writes in the Y code sequence must be completed to preserve state atomicity as indicated by functional block 164.

Next, the second write in the Y code sequence is processed by a pre-write block 166, a store or store conditional block 168 is implemented, and a test block 170 is then executed for store-conditional failure. This operation is similar to the manner described for the processing of the first write by the blocks 158, 160 and 162. The same subset of processes (i.e., those contained in the blocks 158, 160 and 162) is performed for each subsequent write in the multiple write sequence as indicated by the single functional block 172 as each preceding write is successfully completed by a partial or full write. When all writes have been stored, block 174 indicates successful completion of the PAL_CALL routine 132 and an exit occurs through the block 157. The current Y instruction granule can then be completed with state atomicity preserved.

As in the case of the translation branches 65 and 67 in FIG. 3, control along branch 69 proceeds to block 74 in which a determination is made as to whether additional x instructions need to be translated. If so, control proceeds along path 64 to enter the next X instruction for translation.

In summary of the case of processing a CISC to RISC translation by branch 69, a CISC instruction has more than one write to state (because of multiple destinations, or a single unaligned destination). No interlocked state accesses fall into this case, but independent byte accesses must be appropriately handled and all or none of the specified writes must be performed if state atomicity is to be preserved.

The translation is constrained such that the instruction groups 1 and 2 start with a read-and-set instruction. Following those groups are instructions that do all the work of the CISC instruction except for memory and/or register state update, including possibly loads of each longword/quadword that will be updated. The instruction group 3 includes the PAL_CALL routine 132 that specifies all the stores, and the instruction group 4 includes a branch-on-fail to the beginning of the sequence, followed by simple register moves.

A translated sequence that is interrupted before the instruction group 2 completes clears a RISC state bit set by read-and-set, causing the PAL_CALL routine 132 to return a fail message and hence branch back to the beginning of the sequence. With the use of hardware structure such as that described in the referenced PD86-0114, the PAL_CALL routine 132 enters a privileged sequence of non-interruptible RISC code.

The PAL_CALL routine 132 does no stores and returns a fail message where an intervening interrupt has occurred, i.e., if the RISC State bit set by read-and-set is clear. Otherwise, a probe is made of all the possible store locations checking for any possible virtual-memory exceptions. If any are encountered, the PAL_CALL routine 132 does not complete, the exceptions are taken, and the state bit set by read-and-set is cleared. This causes a subsequent reexecution of the PAL_CALL routine 132 to return a fail message, and hence branch back to the beginning of the sequence. Otherwise, the PAL_CALL routine 132 performs all indicated stores. While doing so, it uses the virtual memory information used in the previous probing, even if page tables in shared memory are being simultaneously updated by another processor. Thus, no virtual memory exceptions are generated by the stores.

For each partial-memory-word store, a load-locked/modify/store-conditional sequence is used by the privileged code. No previous stores have been done and the first such store-conditional fails (because another processor stores into the same memory word during the modify), an implementation may either return "fail" from the PAL_CALL routine 132, or it may repeat just the load-locked/modify/store-conditional sequence. After a single store has occurred, subsequent load-locked/modify/store-conditional sequences must be repeated inside the privileged code until they succeed. Upon completion of all the specified stores, the privileged code returns successfully, and the instruction group 3 is completed.

A translated sequence that is interrupted after the instruction group 3 is completed but before the instruction group 4 is completed is forced to complete group 4 by a mechanism interpreting forward through simple register moves as set forth more fully in the cross-reference application Ser. No. 07/666,025. The net effect is that the sequence either executes from beginning to end with no other translated sequence in the middle and no interfering write to the subject memory words, or it is suspended before the completion of the instruction group 3 and subsequently retried from the beginning.

When all of the X instructions have been translated through the branches 65, 67 and 69, the cyclic execution of the program loop 64 is terminated and the accumulated Y code is made available for output as indicated by functional block 76.

Executing the Resultant Y Code with Guaranteed X
State Atomicity and Instruction Granularity As shown in FIG. 4, a Y processor 80 corresponding to the Y computer system 20 (FIG. 1) is provided for executing the resultant Y code with X state atomicity and instruction granularity guaranteed to be preserved. Conventional data input/output devices 82 and an interval clock 84 are coupled to the Y processor 80, and from time to time these devices generate interrupts constituting asynchronous events that demand a temporary diversion of processor operation from the Y code execution. Without the protection guarantee provided by the present invention, processor diversion caused by these or other interrupts is capable of causing a breakdown of X state atomicity and granularity in the execution of special kinds of instructions as previously described.

As shown in FIG. 4, a block 86 represents the input of the generated Y code from an input device to a section 88 of a memory system 90 coupled to the Y processor 80, and a block 87 represents data outputs generated for output devices as a result of Y code execution. The memory system 90 also includes a conventional data section 92, a conventional operating system section 94, and includes the previously-noted X memory state 95. The Y processor 80 includes the previously-noted X register state 97.

An instruction granularity control program (IGC) 96 in memory system 90 is structured to supervise the execution of Y code for instruction granularity. Operation of the IGC program 96 in the execution of the Y code is more fully represented by the flow chart shown in FIGS. 5A and 5B.

Generally, single write and multiple write X instructions translated to the Y code instruction granules are controlled by the IGC program 96 during execution of the Y code. In the case of simple single write instructions, all of the state atomicity and instruction granularity control is directed as disclosed both in this specification and in the previously cross-referenced patent application 1870-0410. In the case of special single write instructions and multiple write instructions, state atomicity is controlled while the translated code for these instructions is executed as described herein in connection with FIGS. 3, 6 and 8 and otherwise in accordance with processing through the IGC program 96.

More specifically, the IGC program 96 (FIG. 5A) starts as indicated at 98 with the generation of an asynchronous event. Generally, an asynchronous event is defined as a diversion of the Y instruction stream due to interrupts that could potentially generate X state changes that are visible to the translated X code. Reference is again made to FIG. 6 for an illustrative representation of the relationship of asynchronous events to an X granule of Y instructions which includes multiple writes.

Figure 5A:
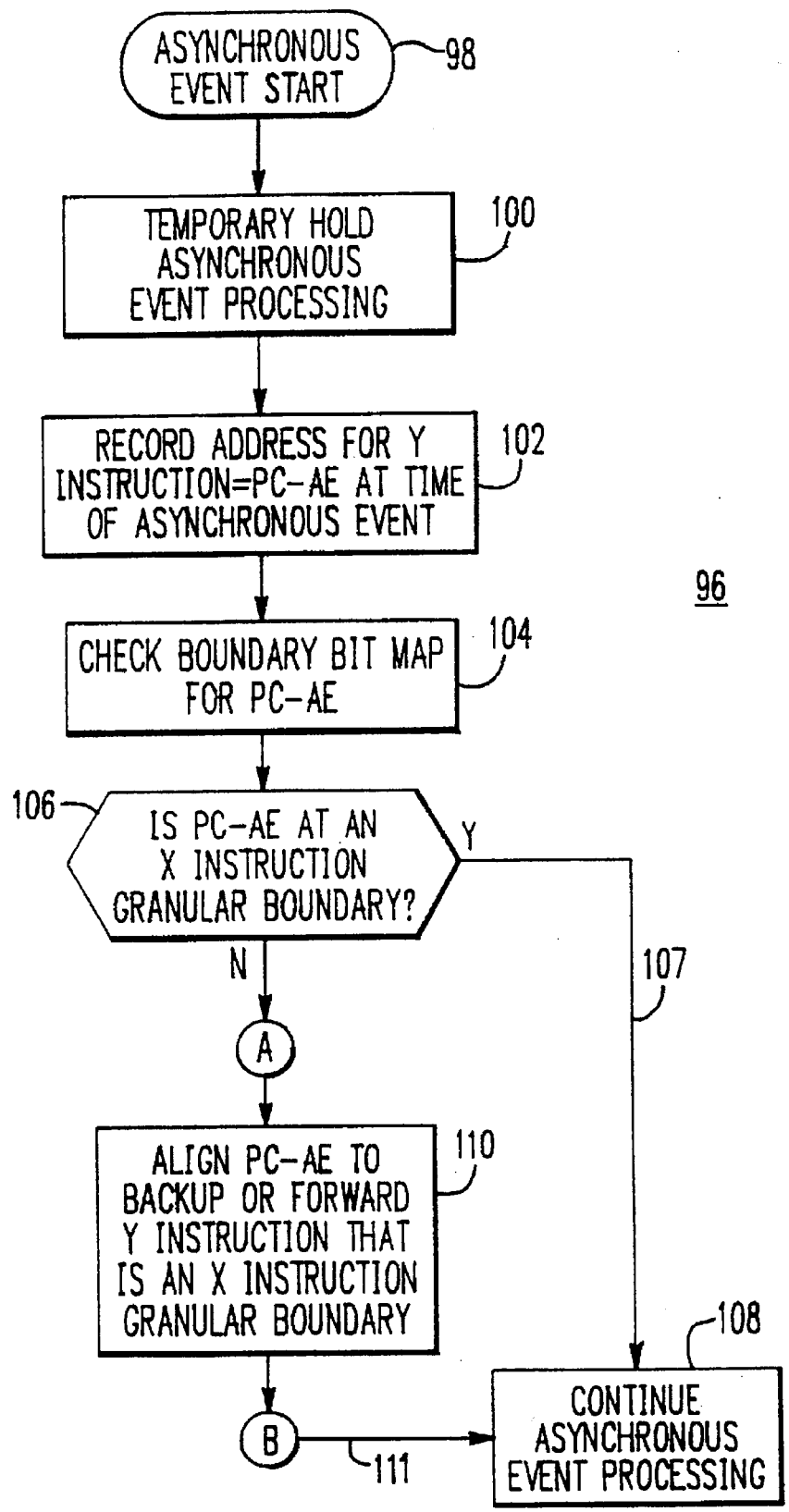
FIGS. 5A and 5B show a flow charts representing functional steps performed by the IGC program.

With continued reference to the flow chart in FIG. 5A, a temporary hold is placed on processing the asynchronous event by functional block 100, and the memory address of the Y instruction (designated as PC-AE) being processed at the time of the asynchronous event is recorded by functional block 102.

Next, the instruction-boundary bit map is checked by block 104 to determine whether the Y instruction PC-AE is an X instruction boundary. If it is, test block 106 directs the IGC program 96 over a path 107 to block 108 which allows interruption of the Y code execution for processing of the asynchronous event without breaking X code instruction granularity.

If the Y instruction PC-AE is not an X instruction boundary, functional block 110 aligns the Y instruction counter PC with the next backup or forward Y instruction that is an X instruction boundary. A program path 111 is then followed by the IGC program 96 to the block 108 for asynchronous event processing as previously described, again without breaking X code instruction granularity. In this instance, the asynchronous event has occurred at a point in time when only one or more but not all of the Y instructions have executed within an X instruction granule, and preservation of X instruction granularity is achieved through operation of the program block 110.

Figure 5B:
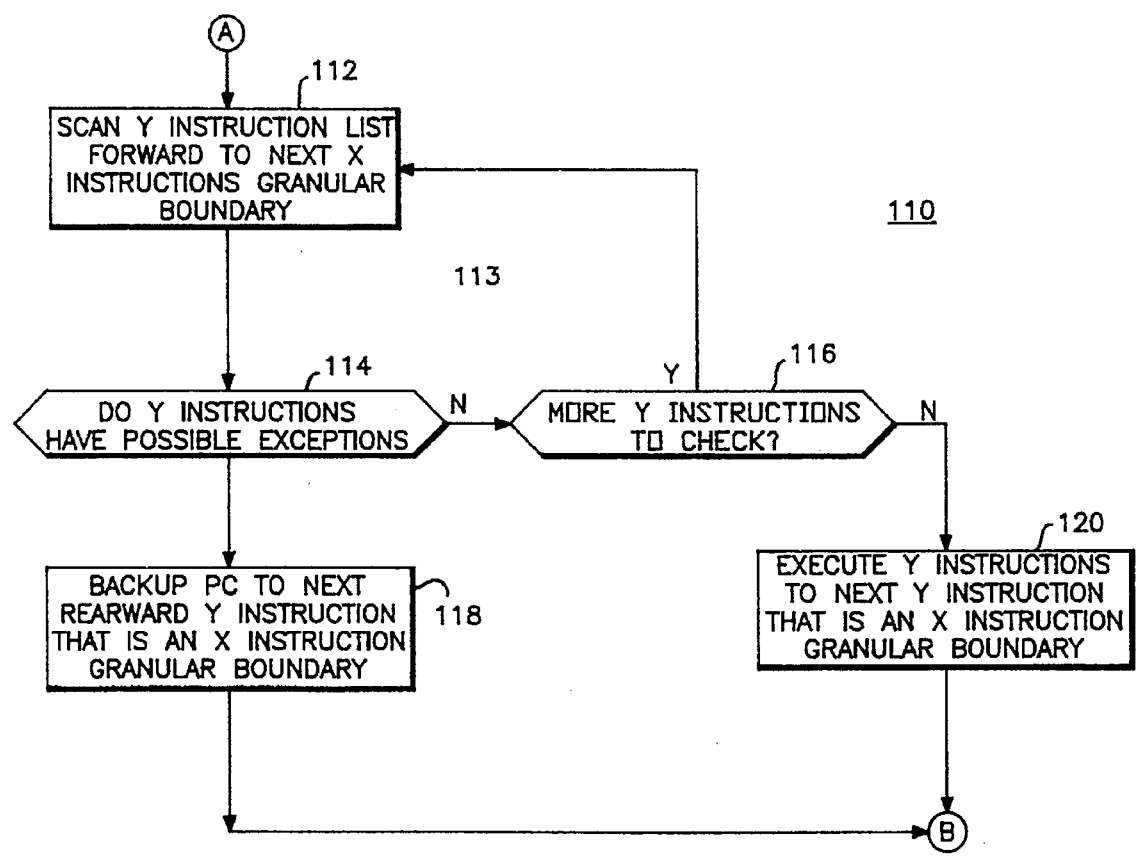

More particularly, as shown for the block 110 in FIG. 5B, a forward scan of the Y instructions is made by functional block 112 in a program loop 113 to find the next Y instruction that is at an X instruction boundary. Test block 114 checks each forwardly scanned Y instruction to determine whether processing the interrupt prior to execution of the remaining Y instructions could produce a Y code execution result different from the result that would have been produced had the corresponding X code been executed with imposition of the same asynchronous event.

In making each forward Y instruction test, the test block 114 preferably determines whether an exception condition may be produced by attempting execution of the Y instruction if the asynchronous event were allowed to be processed and the execution of the Y code sequence subsequently resumed. Generally, an instruction has an exception if it possibly cannot be completed. The following are the general classes of exceptions that, if identified to a forward Y instruction, generate a Y code abort to the next backup Y instruction that is an X boundary:

1.) Memory management exceptions such as access control violations or page faults.
2.) Arithmetic exceptions such as floating point overflow faults or divide by zero faults.
3.) Instruction exceptions such as illegal operation codes or breakpoint operation codes.

In the preferred embodiment of the invention, a list of the applicable exceptions for the code being translated is placed in storage accessible to the IGC program 96 during execution. Exception determinations are thus made by referencing each forwardly scanned Y instruction against the stored exceptions list.

Successive Y instructions are tested in the forward scan, and if all scanned Y instructions show no exception, the remaining Y instructions are executed before asynchronous event processing is enabled by the block 108 (FIG. 5A) without breaking X instruction granularity as previously described.

On the other hand, if a forwardly scanned Y instruction shows an exception under the test by the block 114, functional block 118 immediately backs up the Y program counter to the next backup Y instruction that is an X instruction boundary, and asynchronous event processing is again enabled by the block 108 (FIG. 5A) without breaking X instruction granularity. In this manner, the possibility of a break in X instruction granularity is avoided.

Overall, the present invention provides an effective mechanism for achieving "one to many" application code translations. The generated code is accurate to the original code in execution results as well as state atomicity and instruction granularity. The atomicity and granularity is guaranteed for simple one-write instructions as well as special instructions including multiple-write and read-modify-write single write types. Accordingly, investments in original CISC or similar code can be saved while price/performance benefits can simultaneously be achieved through use of the application code translations on RISC or other advanced price/performance computer systems having relatively reduced instruction sets.

Various modifications and variations can be made in the improved system and method for preserving instruction state-atomicity for translated program code of the present invention by those skilled in the pertaining art without departing from the scope and spirit of the invention. It is accordingly intended that the present invention embrace such modifications and variations to the extent they come within the scope of the appended claims and their equivalents.

What is claimed is:

1. A method for translating a first program code comprising a first sequence of instructions to a second program code comprising a second sequence of instructions and for executing the second program code while preserving instruction state-atomicity of the first program code, the first program code associated with a first computer system having a first state area including a first set of one or more registers and a first memory and characterized by a first architecture adapted to a first instruction set, the second program code associated with a second computer system including a processor, and a second state area corresponding to said first state area and including a second memory and a second set of one or more registers, and characterized by a second architecture adapted to a second instruction set, said method comprising the steps of:

translating a first instruction included in said first sequence to one or more corresponding instructions included in said second sequence;

organizing said one or more corresponding instructions into a granular instruction sequence having at least two groups, a first group including those instructions included in said second program code that perform data operations using temporary storage locations and can be aborted after execution and preserve state atomicity of said first program code, and a second group including instructions of said second program code that update said second state area, said second group including one or more instructions used to implement one or more special write instructions of said first instruction set;

including, in said second program code instructions, a first subsequence of instructions corresponding to a first of said special write instructions included in said first sequence of instructions, said first special write instructions performing a single write to a first location in said second state area, said first subsequence requiring execution without interruption and without intervening conflicting write operations to said first location to preserve state atomicity of said first program code;

including, in said second program code instructions, a second subsequence of instructions corresponding to a second of said special write instructions included in said first sequence of instructions, said second special write instruction performing multiple write operations to said second state area, said second subsequence of instructions requiring execution without interruption and without intervening conflicting write operations;

executing the second program code in the second computer system;

determining the occurrence of an asynchronous event in said second computer system while performing said executing step;

determining, during said executing step, the occurrence of a conflicting write operation to said first memory location aborting, in response to determining said occurrence of said asynchronous event, a granular instruction sequence to preserve first program code instruction state-atomicity and first code instruction granularity if said asynchronous event occurs prior to completing execution of said first group of instructions, or, if the first group of instructions have been executed, prior to executing any instructions in said second sequence belonging to said second group subject to a possible exception, said aborting enabling subsequent asynchronous event processing;

aborting, in response to determining a conflicting write operation, execution of said first subsequence and subsequently retrying execution of said first subsequence;

aborting, in response to determining an asynchronous event, a granular instruction sequence that includes said first subsequence if said asynchronous event occurs during attempted execution of said first subsequence; and delaying, in response to determining an asynchronous event, processing of said asynchronous event and completing a granular instruction sequence being executed A) if said second subsequence is included in the granular instruction sequence and if said asynchronous event occurs after a first write operation during execution of said second instruction subsequence or B) if the asynchronous event occurs after execution of instructions in said second sequence belonging to said second group of instructions that are subject to possible exception.

2. The method of claim 1 wherein said first subsequence is a read-modify-write subsequence.

3. The method of claim 2 wherein said first subsequence is employed to implement a partial write instruction or an interlocked update instruction, said first subsequence including a load-locked store-conditional sequence that reads and modifies input data, conditionally stores the resultant data, and fails said first subsequence if a conflicting write has occurred during its execution, and completes said first subsequence if no conflicting write has occurred during its execution.

4. The method of claim 1 wherein said second subsequence includes a call to a privileged architecture library routine that executes said second subsequence and all of the writes included therein once said privileged architecture library routine is initiated, and wherein initiation of said privileged architecture library routine is permitted if no interrupt has previously occurred in the execution of the current instruction sequence and if remaining accesses to said second state area can be completed without exception.

5. The method of claim 4 wherein said privileged architecture library routine has a first subroutine that tests a first write to be executed to determine whether it is a partial write, performs a load-locked conditional-store to execute said first write if it is a partial write, selectively retries the load-locked conditional-store until it completes if the store-conditional fails as a result of a conflicting state write by said other processor during attempted execution of said first subroutine, completes the load-locked conditional-store-store if no conflicting state write has occurred during a first try if no retry is selected or during a subsequent retry if retries are selected, said privileged architecture library routine being locked in for completion upon completion of said first subroutine, and a second subroutine that subsequently tests a second write to be executed to determine whether it is a partial write, performs a load-locked conditional-store to execute said second write if it is a partial write, retries the load-locked conditional-store until it completes if the store-conditional fails as a result of a conflicting state write by said other processor during attempted execution of said second subroutine, and each successive write to be executed is processed by a subroutine substantially identical to said second subroutine until all of said multiple writes are executed to complete said privileged architecture library routine.

6. The method of claim 5 wherein said first subroutine is retried until it completes successfully.

7. A method for translating a first program code to a second program code and for executing the second program code while preserving instruction state-atomicity of the first program code, the first program code including first program code instructions of a first instruction set associated with a first computer system having a first architecture and a first state area including a first memory and a first register set of one or more registers and the second program code including second program code instructions of a second instruction set associated with a second computer system having a second state area corresponding to said first state area and including a second memory and second register set of one or more registers, said second computer system having a second architecture, said method comprising the steps of:

translating the first code instructions to corresponding second code instructions in accordance with a pattern code identifying one or more of said second code instructions corresponding to one of said first code instructions;

for each first code instruction, organizing the corresponding second code instructions into a granular instruction sequence having at least two groups, a first group including those second code instructions that perform data operations using temporary storage locations and can be aborted after execution and preserve state atomicity of said first program code, and a second group including second program code instructions that update said second state area, said second group including one or more instructions used to implement one or more special write instructions of said first instruction set;

including, in said second program code instructions, a subsequence of instructions corresponding to a first of said special write instructions included in said first sequence of instructions, said first special write instruction performing a single write to a first location in said second state area, said subsequence requiring execution without interruption and without intervening conflicting write operations to said first location to preserve state atomicity of said first program code;

executing the second program code in said second computer system on a first processor;

determining the occurrence of each asynchronous event while performing said executing step;

determining, while performing said executing step, conflicting write to said first memory location by a second processor in said second computer system, said first and second processors accessing said first memory location as a common portion of said second state area;

aborting a granular instruction sequence to preserve first code instruction state-atomicity and first code instruction granularity if an asynchronous event interrupt occurs while executing the sequence before all instructions of the first group have been executed or, if the first group of instructions have been executed, before executing other instructions of the second group that is subject to a possible exception, thereby enabling subsequent asynchronous event processing;

aborting, in response to determining a conflicting write, said subsequence of instructions included in granular instruction sequence if a conflicting write is made by another processor before completion of execution of said subsequence;

aborting a granular instruction sequence that includes said subsequence if an asynchronous event interrupt occurs while attempting execution of said subsequence; and delaying, in response to determining an asynchronous event, the processing of said asynchronous event interrupt and completing a granular instruction sequence being executed if the asynchronous event interrupt occurs after execution of all state update instructions in said second group that are subject to possible exception.

8. The method of claim 7 wherein said subsequence is a read-modify-write subsequence.

9. The method of claim 8 wherein said subsequence is employed to implement a partial write instruction or an interlocked update instruction, said subsequence including a load-locked store-conditional sequence that reads and modifies input data, conditionally stores the resultant data, and fails said subsequence if a conflicting write has occurred during its execution or completes said subsequence if no conflicting write has occurred during its execution.

10. A method for translating a first program code to a second program code and for executing the second program code while preserving instruction state-atomicity of the first program code, the first program code including first code instructions of a first instruction set associated with a first computer system having a first state area including a first memory and a first set of one or more registers, said first computer system having a first architecture, the second program code including second code instructions of a second instruction set associated with a second computer system having a second state area corresponding to said first state area and having a second memory and a second register set of one or more registers, said second computer system having a second architecture, said method comprising the steps of:

translating the first code instructions to corresponding second code instructions in accordance with a pattern code identifying, for one of said first code instructions, one or more corresponding second code instructions included in said second program code;

organizing the second code instructions for each first code instruction into a granular instruction sequence having at least two groups, a first group including those second code instructions that perform data operations using temporary storage locations and can be aborted after execution and preserve state atomicity of said first program code, and a second group including second program code instructions that update said second state area, said second group including one or more instructions used to implement one or more special write instructions of said first instruction set;

including, in said second program code instructions, a subsequence of instructions corresponding to a special write instruction included in said first sequence of instructions, said special write instruction performing multiple write operations to said second state area, said subsequence of instructions requiring execution without interruption and without intervening conflicting write operations;

executing in said second computer system said second program code;

determining an asynchronous event while performing said executing step;

aborting a granular instruction sequence to preserve first code instruction state-atomicity and first code instruction granularity if an asynchronous event interrupt occurs while executing the granular instruction sequence before all of the instructions of the first group have been executed or, if the instructions in the first group have been executed, before executing an instruction of the second group that is subject to a possible exception, thereby enabling subsequent asynchronous event processing;

delaying, in response to said determining step, the processing of an asynchronous event interrupt and completing a granular instruction sequence being executed A) if said subsequence is included in the granular instruction sequence and if the asynchronous event interrupt occurs at most after a first write during execution of said instruction subsequence or B) if the asynchronous event interrupt occurs after execution of instructions in said second group that are subject to possible exception.

11. The method of claim 10 wherein said subsequence includes a single call to a privileged architecture library routine that executes said subsequence and all of the writes included therein once said privileged architecture library routine is initiated, and wherein initiation of said privileged architecture library routine is permitted if no interrupt has previously occurred in the execution of the current instruction sequence and if remaining accesses to said second state area can be completed without exception.

12. The method of claim 11 wherein said privileged architecture library routine has a first subroutine that tests a first write of said multiple writes to be executed to determine whether it is a partial write, performs a load-locked conditional-store to execute said first write if it is a partial write, selectively retries the load-locked conditional-store until it completes if the store-conditional fails as a result of a conflicting state write by said other processor during attempted execution of said first subroutine, completes the load-locked conditional-store if no conflicting state write has occurred during a first try if no retry is selected or during a subsequent retry if retries are selected, wherein said privileged architecture library routine is locked in for completion upon completion of said first subroutine, and a second subroutine subsequently tests a second write to be executed to determine whether it is a partial write, performs a load-locked conditional-store to execute said second write if it is a partial write, retries the load-locked conditional-store until it completes if the store-conditional fails as a result of a conflicting state write by said other processor during attempted execution of said second subroutine, and wherein each successive write to be executed is processed by a subroutine substantially identical to said second subroutine until all writes are executed to complete said privileged architecture library.

13. The method of claim 12 wherein said first subroutine is retried until it completes successfully.

14. A method for translating a first program code to a second program code to facilitate preserving state atomicity of the first program code during execution of the second program code, the first program code including first code instructions of a first instruction set associated with a first computer system having a first architecture and first state area including a first memory and a first set of one or more registers, the second program code including second code instructions of a second instruction set associated with a second computer system having a second state area corresponding to the first state area and having a second memory and a second set of one or more registers, said second computer system having a second architecture, said method comprising the steps of:

translating the first code instructions to corresponding second code instructions in accordance with a pattern code identifying one or more corresponding second code instructions included in said second program code for one of said first code instructions included in said first program code;

organizing the corresponding second code instructions into a granular instruction sequence having in order at least two groups, a first group including those second code instructions that perform data operations using temporary storage locations and can be aborted after execution and preserve state atomicity of said first program code, and a second group including those second program code instructions that update said second state area, said second group including one or more instructions used to implement one or more special write instructions of said first instruction set;

including, in said second program code instructions, a first subsequence of instructions corresponding to a first of said special write instructions included in said first sequence of instructions, said first special write instruction performing a single write to a first location in said second state area, said first subsequence requiring execution without interruption and without intervening conflicting write operations to said first location to preserve state atomicity of said first program code;

including in said second program code instructions a second subsequence of instructions corresponding to a second of said special write instructions included in said first sequence of instructions, said second special write instruction performing multiple write operations to said second state area, said second subsequence requiring execution without interruption and without intervening conflicting write operations;

structuring said first subsequence to abort and subsequently retry until successful execution of said first subsequence is completed if a conflicting write is made by said other processor before completion of execution of said first subsequence;

structuring said first subsequence to fail if an asynchronous event interrupt occurs during attempted execution of said first subsequence,; and structuring said second subsequence for privileged non-interruptible execution thereby delaying the processing of an asynchronous event interrupt that occurs during execution of said second program code until after completion of the execution of said second subsequence.

15. A method for executing a second program code while preserving state atomicity of a first program code from which the second program code is translated, the first program code including first code instructions of a first instruction set associated with a first computer system having a first state area including a first memory and first set of one or more registers, said first computer system having a first architecture, the second program code including second code instructions of a second instruction set associated with a second computer system having a second state area corresponding to said first state area and including a second memory and a second set of one or more registers, said second computer system having a second architecture, the second code instructions for each of said first code instructions being organized into a granular instruction sequence having at least two groups, a first group including those second code instructions that perform data operations using temporary storage locations and can be aborted after execution and preserve state atomicity of said first program code, and a second group including one or more instructions used to implement one or more special write instructions of said first instruction set, a first of said special write instructions resulting in including a first subsequence of instructions in said second sequence for processing a single write to a first memory location, said first sequence requiring execution without interruption and without intervening conflicting writes to said first memory location, said special write instructions including a second special write instruction resulting in a second subsequence of instructions being included in said second sequence for processing multiple write operations, said second sequence requiring execution without any interruption, said method comprising the steps of:

executing the second program code in said second computer system;

determining the occurrence of an asynchronous event while performing said executing step;

determining, while performing said executing step, a conflicting write to said first memory location;

aborting and subsequently retrying a granular instruction sequence to preserve first code instruction state-atomicity and first code instruction granularity if an asynchronous event interrupt occurs during the execution of said granular instruction sequence before all instructions of the first group have been executed or, if the first group of instructions have been executed, before the execution of any instruction of the second group that is subject to a possible exception;

aborting and subsequently retrying said first subsequence in a granular instruction sequence that includes said first subsequence if a conflicting write is made prior to completing execution of said first subsequence;

aborting a granular instruction sequence that includes said first subsequence if an asynchronous event interrupt occurs during attempted execution of said first subsequence; and delaying the processing of an asynchronous event interrupt and completing a granular code instruction sequence being executed A) if said second subsequence is included in the granular sequence and if the asynchronous event interrupt occurs at most after a first write during execution of said second subsequence or B) if the asynchronous event interrupt occurs after execution of one of said special write instructions or after execution of instructions in said second group that are subject to possible exception.

16. A system for translating a first program code to a second program code and for executing the second program code preserving instruction state-atomicity of the first code, the first program code including first code instructions of a first instruction set associated with a first computer system having a first architecture and a first state area including a first memory and a first set of one or more registers, the second program code including second code instructions of a second instruction set associated with a second computer system having a second state area corresponding to said first state area and including a second memory and a second set of one or more registers, said second computer system having a second architecture, said system comprising:

means for translating said first program code to said second program code using said first computer system having a first processor and a first memory system coupled to said first processor;

means for translating said first program code to said second program code by translating each of said first code instructions to one or more second code instructions in accordance with a pattern code identifying one or more corresponding second code instructions included in said second program code for one of said first code instructions included in said first program code;

means for organizing the corresponding second code instructions for said first code instruction into a granular instruction sequence having in order at least two groups, a first group including those second code instructions that perform data operations using temporary locations and can be aborted after execution and preserve state atomicity of said first program code, and a second group including one or more instructions used to implement one or more special write instructions of said first instruction set;

means for including in said second program code a first subsequence of instructions corresponding to a first of said special write instructions included in said first sequence of instructions, said first special write instructions performing a single write to a first memory location, said first subsequence of instructions requiring execution without any interruptions of intervening conflicting write operations to said first memory location;

means for including a second subsequence of instructions in said second program code corresponding to a second special write instruction, said second special write instructions performing multiple write operations, said second subsequence requiring execution without an interruption;

means for executing the second program code in said second computer system, said second computer system having a plurality of processors and a memory and register state, a first and a second of said plurality of processors are coupled to said memory;

means for determining during execution of said second program code an asynchronous event and a conflicting write to said first memory location by said first and second processors in said second computer system;

means for aborting and subsequently retrying a granular instruction sequence to preserve first code instruction state-atomicity and first code instruction granularity if an asynchronous event interrupt occurs during the execution of said granular sequence before all instructions of the first group have been executed or, if the first group of instructions have been executed, before the execution of an instruction in the second group instruction that is subject to a possible exception, thereby enabling subsequent asynchronous event processing;

means for aborting and subsequently retrying said first subsequence of instructions in a granular instruction sequence that includes said first subsequence if a conflicting write occurs before completing execution of said first subsequence;

means for aborting a granular instruction sequence that includes said first subsequence for a retry if an asynchronous event interrupt occurs during attempted execution of said first subsequence; and means for delaying the processing of an asynchronous event interrupt and completing a granular instruction sequence being executed A) if said second subsequence is included in the granular instruction sequence and if the asynchronous event interrupt occurs at most after a first write during execution of said second subsequence or B) if the asynchronous event interrupt occurs after execution of all instructions in said second group that are subject to possible exception.

17. The system of claim 16 wherein said first subsequence is a read-modify-write subsequence.

18. The system of claim 17 wherein said first subsequence is employed to implement a partial write instruction or an interlocked update instruction, said first subsequence including a load-locked store-conditional sequence that reads and modifies input data, conditionally stores the resultant data, and fails said first subsequence if a conflicting write has occurred during its execution or completes said first subsequence if no conflicting write has occurred during its execution.

19. The system of claim 16 wherein said second subsequence includes a single call to a privileged architecture library routine that executes said second subsequence and all of the writes included therein once said privileged architecture library routine is initiated, and wherein initiation of said privileged architecture library routine is permitted if no interrupt has previously occurred in the execution of the current instruction sequence and if all remaining state access can be completed without exception.

20. The system of claim 19 wherein said privileged architecture library routine has a first subroutine that tests a first write to be executed to determine whether it is a partial write, performs a load-locked conditional-store to execute said first write if it is a partial write, selectively retries the load-locked conditional-store until it completes if the store-conditional fails as a result of a conflicting state write by said other processor during attempted execution of said first subroutine, completes the load-locked conditional-store if no conflicting state write has occurred during a first try if no retry is selected or during a subsequent retry if retries are selected, wherein said PAL call routine is locked in for completion upon completion of said first subroutine, and wherein a second subroutine subsequently tests a second write to be executed to determine whether it is a partial write, performs a load-locked conditional-store to execute said second write if it is a partial write, retries the load-locked conditional-store until it completes if the store-conditional fails as a result of a conflicting state write by said other processor during attempted execution of said second subroutine, and wherein each successive write to be executed is processed by a subroutine substantially identical to said second subroutine until all writes are executed to complete said privileged architecture library routine.

21. The system of claim 20 wherein said first subroutine is retried until it completes successfully.

22. A system for translating a first program code to a second program code and for executing the second program code while preserving instruction state-atomicity of the first code, the first program code associated with a first computer system having a first architecture and a first state area including a first memory and a first set of one or more registers, and the second program code associated with a second computer system having a second architecture and a second state area corresponding to said first state area and having a second memory and second set of one or more registers, said system comprising:

a first computer system having a first processor for translating the first program code to the second program code;

means for translating instructions included in the first code to one or more corresponding instructions included in said second code instructions in accordance with a pattern code;

means for organizing the corresponding instructions included in said second code program code into a granular instruction sequence having at least two groups, a first group including those second code instructions that perform data operations using temporary storage locations and can be aborted after execution and preserve state atomicity of said first program code, and a second group including second program code instructions that update said second state area, said second group including one or more special write instructions of said first instruction set;

means for including a subsequence of instructions in said second program code corresponding to a special write instructions for processing a single write operation to a first memory location, said subsequence of instructions requiring execution without interruption and without intervening conflicting write operations to said first memory location;

means for determining during execution of said second program code the occurrence of an asynchronous event and the occurrence of a conflicting write to said first memory location by said;

means for aborting and subsequently retrying a granular instruction sequence to preserve first code instruction state-atomicity and first code instruction granularity if an asynchronous event interrupt occurs during the execution of said granular instruction sequence before all of the first group of instructions have been executed or, if the first group of instructions have been executed, before the execution of an instruction in the second group that is subject to a possible exception, thereby enabling subsequent asynchronous event processing;

means for aborting and subsequently retrying execution of said subsequence of instructions in a granular instruction sequence that includes said subsequence if a conflicting write is made before completing execution of said subsequence;

means for aborting a granular instruction sequence that includes said subsequence if an asynchronous event interrupt occurs during attempted execution of said subsequence; and means for delaying the processing of an asynchronous event interrupt and completing a granular instruction sequence being executed if the asynchronous event occurs after execution of instructions in said second group that are subject to possible exception.

23. The system of claim 22 wherein said subsequence is a read-modify-write subsequence.

24. The system of claim 23 wherein said subsequence is employed to implement a partial write instruction or an interlocked update instruction, said subsequence including a load-locked store-conditional sequence that reads and modifies input data, conditionally stores the resultant data, and fails said subsequence if a conflicting write has occurred during its execution or completes said subsequence if no conflicting write has occurred during its execution.

25. A system for translating a first program code to a second program code and for executing the second program code in a manner that preserves instruction state-atomicity of the first code, the first program code associated with a first computer system having a first architecture and a first state area including a first memory and a first set of one or more registers, and the second program code associated with a second architecture and a second state area corresponding to the first state area and including a second memory and a second set of one or more registers, said system comprising:

means for translating said first program code to the second program code in said second computer system;

means for translating each successive instruction in the first program code to one or more instructions included in said second program code in accordance with a pattern code identifying one or more corresponding instructions in said second program for one of said instructions in said first program code;

means for organizing corresponding instructions included in the second program code for each first code instruction into a granular instruction sequence having in order at least two groups, a first group including second code instructions that perform data operations using temporary storage locations and can be aborted after execution and preserve state atomicity of said first program code, and a second group including second program code instructions that perform updates to said second state area, said second group including one or more instructions used to implement one or more special write instructions of said first instruction set;

means for including a subsequence of instructions in said second program code corresponding to one of said special write operations performing multiple write operations, said subsequence requiring execution without any interruption;

means for determining during execution of said second program code the occurrence of an asynchronous event;

means for aborting and subsequently retrying a granular instruction sequence to preserve first code instruction state atomicity and first code instruction granularity if an asynchronous event interrupt occurs during the execution of said granular instruction sequence before all of the first group of instructions have been executed or, if the first group of instructions have been executed, before the execution of an instruction in the second group that is subject to a possible exception, thereby enabling subsequent asynchronous event processing;

means for delaying the processing of an asynchronous event interrupt and completing a granular instruction sequence being executed A) if said subsequence is included in the granular instruction sequence and if the asynchronous event interrupt occurs at most after a first write during execution of said subsequence or B) if the asynchronous event occurs after executing instructions in said second group that are subject to possible exception.

26. The system of claim 25 wherein said subsequence includes a single call to a privileged architecture library routine that executes said subsequence and all of the writes included therein once said privileged architecture library routine is initiated, and wherein initiation of said privileged architecture library routine is executed if no interrupt has previously occurred in the execution of the current instruction sequence and if all remaining state access can be completed without exception.

27. The system of claim 26 wherein said privileged architecture library routine has a first subroutine that tests a first write to be executed to determine whether it is a partial write, performs a load-locked conditional-store to execute said first write if it is a partial write, selectively retries the load-locked conditional-store until it completes if the store-conditional fails as a result of a conflicting state write by said other processor during attempted execution of said first subroutine, completes the load-locked conditional-store if no conflicting state write has occurred during a first try if no retry is selected or during a subsequent retry if retries are selected, wherein said privileged architecture library routine is locked in for completion upon completion of said first subroutine, and wherein a second subroutine subsequently tests a second write to be executed to determine whether it is a partial write, performs a load-locked conditional-store to execute said second write if it is a partial write, retries the load-locked conditional-store until it completes if the store-conditional fails as a result of a conflicting state write by said other processor during attempted execution of said second subroutine, and wherein each successive write to be executed is processed by a subroutine substantially identical to said second subroutine until all writes are executed to complete said privileged architecture library.

28. The system of claim 27 wherein said subsequence is retried until it completes successfully.

29. A system for translating a first program code to a second program code to facilitate preserving state atomicity of the first code when the second code is executed, the first program code associated with a first computer system having a first computer architecture, a first instruction set, and a first state area having a first memory and first set of one or more registers, and the second program code associated with a second computer system having a second computer architecture, a second instruction set, and a second state area corresponding to said first state area and having a second memory and second set of one or more registers, said system comprising:

means for translating each successive instruction in the first program code to one or more instructions included in said second program code in accordance with a pattern code identifying one or more corresponding instructions included in said program code for one of the instructions included in the first program code;

means for organizing the corresponding instructions included in the second program code for each instruction included in said first program code into a granular instruction sequence having at least two groups, a first group including those second code instructions that perform data operations using temporary storage and can be aborted after execution and preserve the state atomicity of said first program code, and a second group including instructions from said second program code that update said second state area, said second group including one or more instructions used to implement one or more special write instructions of said first instruction set;

means for including a first subsequence of instructions in said second program code corresponding to a first of said special write instructions processing a single write to a first memory location, said first subsequence requiring execution without any interruptions and without any intervening conflicting write operations to said first memory location; and means for including a second subsequence of instructions in said second program code corresponding to a second of said special write operations for processing multiple write operations, said second subsequence requiring execution without an interruption;

means for aborting said first subsequence and subsequently retrying to successfully complete execution of said first subsequence included in a granular instruction sequence if a conflicting write occurs prior to completing execution of said first subsequence;

means for aborting a granular instruction sequence that includes said first subsequence for a retry if an asynchronous event interrupt occurs during attempted execution of said first subsequence; and means, included in said second computer system, for delaying the processing of an asynchronous event interrupt and completing a granular instruction sequence being executed A) if said second subsequence is included in the granular instruction sequence and if the asynchronous event interrupt occurs at most after a first write during execution of said second subsequence or B) if the asynchronous event occurs after execution of instructions in said second group that are subject to possible exception.

30. A system for executing a second program code while preserving state atomicity of a first program code from which the second program code is translated, the first program code associated with a first computer system having a first computer architecture, a first instruction set, and a first state area including a first memory and first set of one or more registers, and the second program code associated with a second computer system having a second computer architecture, a second instruction set, a second state area corresponding to said first state area, and a second memory and second set of one or more registers, each of the instructions of said second program code being organized into a granular instruction sequence having at least two groups, a first group including those second code instructions that perform data operations using temporary storage locations and can be aborted after execution and preserve state atomicity of said first program code, and a second group including instructions in said second program code that update said second state area, said second group including one or more instructions used to implement one or more special write instructions of said first instruction set, a first of said special write instructions processing a single write to a first memory location and causing a first subsequence of instructions to be included in said second program code, said first subsequence being executed without an interruption and without intervening conflicting write operations to said first memory location, and a second of said special write instructions performing multiple write operations and causing a second subsequence of instructions to be included in said second program code, said second subsequence requiring execution without an interruption, said system comprising:

means for executing said second program code in said second computer system;

means for determining the occurrence of an asynchronous event while performing said executing step;

means for determining while performing said executing step the occurrence of a conflicting write to said first memory location;

means for aborting and subsequently retrying a granular instruction sequence to preserve first code instruction state-atomicity and first code instruction granularity if an asynchronous event interrupt occurs during the sequence execution before all of the instruction of said first group have been executed or, if the first group of instructions have been executed, before the execution of an instruction in said second group that is subject to a possible exception;

means for aborting said first subsequence and subsequently retrying until successful execution of said first subsequence is completed if a conflicting write occurs before completion of execution of said first subsequence;

means for aborting a granular instruction sequence that includes said first subsequence if an asynchronous event interrupt occurs during attempted execution of said first subsequence; and means for delaying the processing of an asynchronous event interrupt and completing a granular instruction sequence being executed A) if said second subsequence is included in the granular instruction sequence and if the asynchronous event interrupt occurs at most after a first write during execution of said second subsequence or B) if the asynchronous event interrupt occurs after execution of one of said special write instruction or after execution of instructions in said second group that are subject to possible exception.

31. A method for translating a first program code to a second program code and for executing the second program code in a manner that preserves instruction state-atomicity of the first code, the first program code associated with a first computer system having a first computer architecture, a first instruction set, and a first state area including a first memory and a first set of one or more registers, and the second program code associated with a second computer system having a second computer architecture, a second instruction set, a second state area corresponding to said first state area, second memory and a second set of one or more registers, said method comprising the steps of:

translating each instruction included in the first program code to one or more corresponding instructions included in the second program code in accordance with a pattern code identifying said corresponding instructions for one of said instructions in the first program code;

organizing the corresponding instructions included in said second program code for each first code instruction into a granular instruction sequence having at least two groups, a first group including those second code instructions that perform data operations using temporary storage location and can be aborted after execution and preserve state atomicity of said first program code, and a second group including instructions of said second program code that update said second state area, said second group including two or more instructions used to implement one or more special write instructions of said first instruction set;

including in said second instruction group a subsequence of instructions corresponding to a first of said special write instructions to perform an operation that must be processed as a whole without any intervening conflicting event;

executing said second program code in said second computer system;

determining, while performing said executing step, the occurrence of an intervening event that actually or possibly creates a conflict with memory atomicity of said first special write instruction;

aborting and subsequently retrying execution of a granular instruction sequence to preserve first code instruction state-atomicity and first code instruction granularity if an asynchronous event interrupt occurs during the execution of said granular instruction sequence before all of the instructions of said first group have been executed or, if the first group of instructions have been executed, before the execution of an instruction in said second group that is subject to a possible exception, thereby enabling subsequent asynchronous event processing;

aborting execution of a granular instruction sequence and retrying until successful execution is completed of said subsequence included in said granular instruction sequence if said first special write operation is a single write instruction and if a conflicting write is detected before completing execution of said subsequence;

aborting a granular instruction sequence that includes said subsequence if said subsequence corresponds to a first special write instructions that is a single write instruction and if an asynchronous event interrupt is a possible conflict during attempted execution of said subsequence; and delaying processing an asynchronous event interrupt and completing a granular instruction sequence being executed A) if said first special write instruction is a multiple write instruction and said subsequence is included in the granular instruction sequence and if the asynchronous event interrupt occurs at most after a first of said multiple writes during execution of said instruction subsequence or B) if the asynchronous event interrupt occurs after execution of instructions in said second group that are subject to possible exception.

32. The method of claim 31 wherein said first special write instruction has one or more corresponding instructions in said subsequence for processing a single write to a first memory location in accordance with a requirement that said subsequence must be executed without any interruption and without any intervening conflicting writes to said first memory location.

33. The method of claim 31 wherein said subsequence performs multiple writes that must all be executed without any interruption.

34. A system for translating a first program code to a second program code and for executing the second program code in a manner that preserves instruction state-atomicity of the first code, the first program code associated with a first computer system having a first computer architecture, a first instruction set, and a first state area including a first memory and a first set of one or more registers, and the second program code associated with a second computer system having a second computer architecture, a second instruction set, a second state area corresponding to said first state area, a second memory, and a second set of one or more registers, the system comprising:

means for translating each instruction in the first program code to one or more instructions included in the second program code;

means for organizing the instructions in said second program code corresponding to each instruction in said first program code into a granular instruction sequence having at least two groups, a first group including those second code instructions that perform data operations using temporary storage locations and can be aborted after execution and preserve state atomicity of said first program code, and a second group including instructions of said second program code that update said second state area, said second group including one or more instructions used to implement one or more special write instructions of said first instruction set;

means for determining during execution of said second program code the occurrence of an intervening event that actually or possibly creates a conflict with memory atomicity of one of said first special write instruction;

means for aborting and retrying a granular instruction sequence to preserve first program code instruction state-atomicity and first program code instruction granularity if an asynchronous event interrupt occurs during execution of said granular instruction sequence before all instructions of the first group have been executed or, if the first group of instructions have been executed, before the execution of an instruction of second group that is subject to a possible exception;

means for aborting a subsequence of instructions corresponding to one of said special write instructions and subsequently retrying said subsequence until successful execution is completed if said subsequence is a single write instruction to a first memory location and if a conflicting write to said first memory location is detected before completing execution of said subsequence;

means for aborting a granular second code instruction sequence that includes said subsequence if said subsequence is a single write instruction and if an asynchronous event interrupt occurs during attempted execution of said subsequence; and means for delaying the processing of an asynchronous event interrupt and completing a granular second code instruction sequence being executed A) if said subsequence performs multiple write operations and is included in the granular instruction sequence and if the asynchronous event interrupt occurs at most after a first of said multiple writes during execution of said subsequence or B) if the asynchronous event occurs after execution of all instructions in said second group that are subject to possible exception.

\* \* \* \* \*